June 14, 1960   J. F. PETTERSON   2,940,421
MOTORCYCLE TRAFFIC OFFICER'S TIRE MARKING DEVICE
Filed Jan. 13, 1959
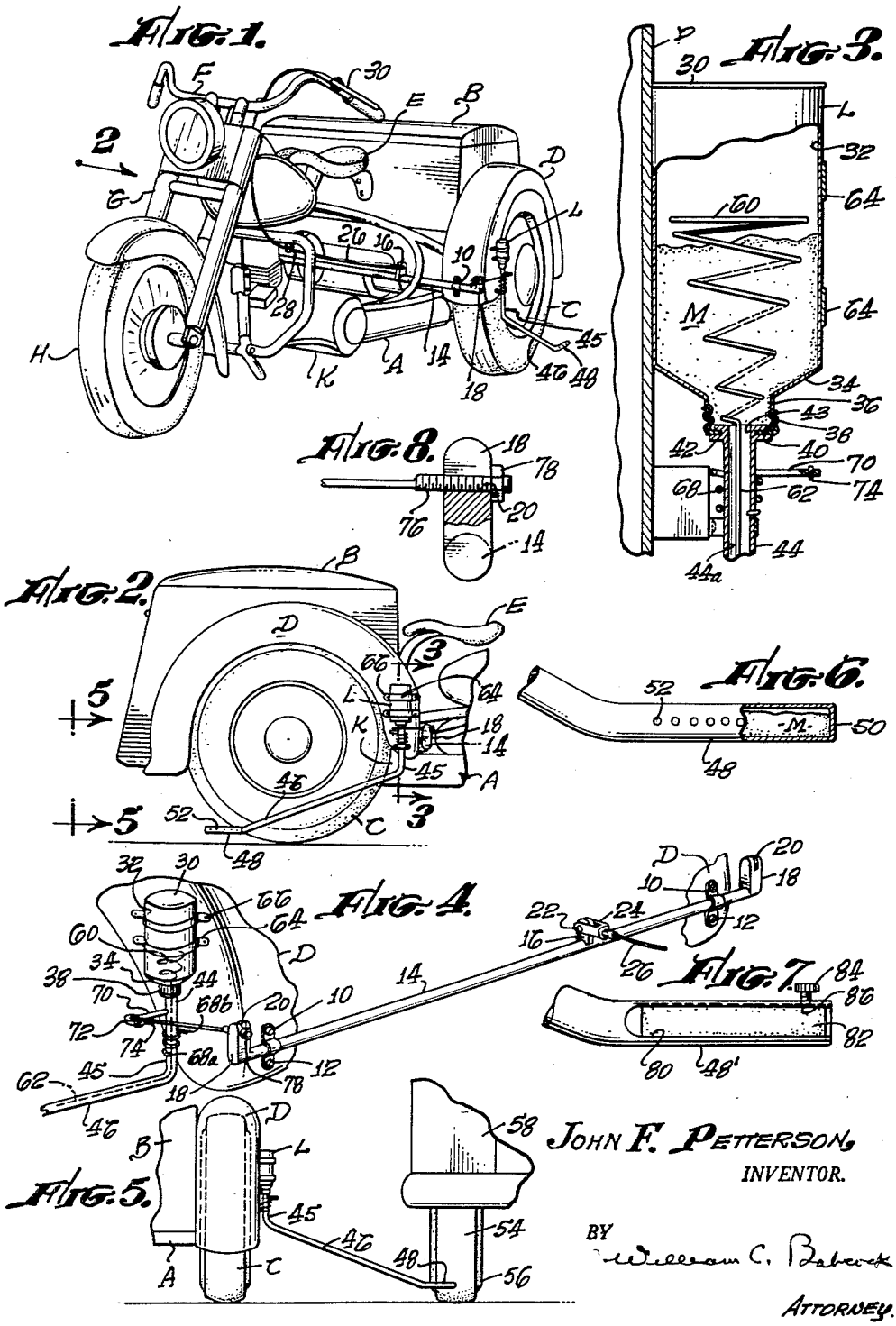
JOHN F. PETTERSON,
INVENTOR.
BY William C. Babcock
ATTORNEY.

United States Patent Office 2,940,421
Patented June 14, 1960

2,940,421

MOTORCYCLE TRAFFIC OFFICER'S TIRE MARKING DEVICE

John F. Petterson, 4114 E. 2nd St., Long Beach, Calif.

Filed Jan. 13, 1959, Ser. No. 786,527

13 Claims. (Cl. 118—308)

The present invention relates generally to the field of motorcycle accessories, and more particularly to a tire marking device for a motorcycle traffic officer that permits the marking of tires on parked vehicles as a mounted traffic officer travels past same.

It has long been a common expedient with traffic officers in most cities of any size to mark the tires of parked vehicles in order to determine whether vehicles have been parked for longer than the legal time limit in a particular zone, but heretofore this operation has been inefficient. Normally, each officer is equipped with a wand or stick having a piece of chalk affixed to the end thereof, which must be replaced periodically. In addition, on rainy or foggy days, due to the slippery wet surface of the tire, the chalk ineffectively slides thereacross without making a lasting mark by which the officer can determine whether a vehicle has been parked overtime.

A major object of the present invention is to provide an inexpensive accessory that may be readily mounted on a traffic officer's motorcycle with a minimum of time and effort, and which permits of convenient, effective marking of the tires of parked vehicles as the officer passes same on his motorcycle, irrespective of whether the tires are dry, wet or moist.

Another object of the invention is to provide a device by means of which a motorcycle officer can mark the tires of parked vehicles without removing his hands from the handlebars, or removing his eyes from his path of travel.

A further object of the invention is to supply motorcycle accessory that permits marking of vehicle tires, irrespective of the direction in which the motorcycle is passing same, which accessory requires the replenishing of marking material only after prolonged use, in contrast to the frequent replacement of chalk employed heretofore.

A still further object of the invention is to provide a traffic officer's tire marking device, which while adapted for marking the black tread of the tire, will not mark the white side wall thereof.

These and other objects and advantages of the present invention will become apparent from the following description of a preferred and alternate forms thereof, and from the accompanying drawing illustrating these forms in which:

Figure 1 is a perspective view of a conventional traffic officer's three-wheeled motorcycle showing one of the inventions mounted on one rear fender thereof that is adapted to be actuated by a trigger assembly mounted on the motorcycle handlebar;

Figure 2 is a fragmentary side elevational view of a traffic officer's motorcycle showing the invention mounted thereon, with the marking portion of the device being in inoperative position and extending longitudinally rearward from the portion of the invention which contains particled marking material;

Figure 3 is an enlarged fragmentary transverse cross-sectional view of the invention showing the marking material container, the spring used in agitating the material, as well as the pivotal connection from which marking material is delivered from the container for tire marking purposes;

Figure 4 is a perspective view of the actuating portion of the invention, showing the actuator which is adapted to move one of the marking devices mounted on the right-hand fender of the motorcycle to a marking position;

Figure 5 is a fragmentary rear view of the motorcycle shown in Figure 1, showing one of the tire marking inventions being actuated to mark the tire of a parked vehicle as the motorcycle on which it is mounted passes thereby;

Figure 6 is a fragmentary view of a tube through which the particled material is delivered showing the end extremity thereof which is perforated to permit the material to be discharged therefrom to contact the tire of a parked vehicle;

Figure 7 is a fragmentary view of a tube that it pivotally movable from the position shown in Figure 2 to that shown in Figure 5, with the tube holding a piece of chalk or crayon as desired in such a position therein that it may be wiped across the tread portion of a tire without marking the white side wall thereof; and Figure 8 is a vertical cross-sectional view of one of the bifurcated members to which a connecting member may be removably affixed.

Referring to Figure 1 of the drawing, a conventional traffic officer's motorcycle is shown which includes a chassis A on which a trunk or body B is transversely mounted and supported between two laterally separated identical rear wheels C, over which inverted arcuate fenders D extend. The motorcyle includes a conventional seat E located forwardly of body B. Handlebars F are affixed to the upper portion of a pivotal fork G that extends downwardly to rotatably support a front wheel H.

The tire marking device of the present invention includes two identical laterally spaced bearing-defining brackets 10 that are removably affixed by screws 12, or other fastening means, to the forward surface portions of fenders D. Brackets 10 are disposed in a horizontal plane to rotatably support a rod 14 of circular cross section having an arm 16 projecting upwardly therefrom. Each end of rod 14 terminates in two identical upwardly projecting bifurcated members 18, each of which has a downwardly extending slot 20 formed therein.

A pin 22 extends through arm 16 to pivotally engage a yoke 24 affixed to the rearward end of an elongate flexible actuating member 26 which extends forwardly through a guide 28 and upwardly to handlebars F, where it terminates in a conventional trigger mechanism 30. Actuation of trigger mechanism 30 causes clockwise motion of rod 14, as shown in Figure 4. By reason of the bifurcated members 20 rod 14 is adapted to actuate either of the tire marking inventions, one each of which, as previously mentioned, is mounted on each of the fenders D to permit marking of tires of parked vehicles, irrespective of whether the left or right-hand side of motorcycle K (Figure 1) is adjacent thereto. Inasmuch as the inventions disposed on fenders D are identical, only one will be described herein.

Each of the inventions mounted on one of the fenders D includes a container L for particles of marking material M, as may best be seen in Figure 3. Container M comprises a circular bottom 30 from which a cylindrical side wall 32 extends that develops into an externally threaded neck 36 that is engaged by a threaded cap 38 having a ring-shaped flange 40. A grooved circular member 42, preferably formed of a resilient material, rotatably and sealingly engages flange 40. Member 42 has a central bore 43 extending therethrough. A tube 44 is rigidly connected to member 42 disposed normal relative thereto, and a bore 44a is formed in tube 44 which is in communication with bore 43. Tube 44 includes a first portion 45 disposed on a vertical axis, and a downwardly and rearwardly extending second portion 46, as best seen in Figure 2. Portion 46 develops into a rearwardly positioned end portion 48 that is closed by an end piece 50. A number of longitudinally spaced perforations 52 are formed in end portion 48 that may be brought into contact with the tread 54 of a tire 56 of a parked vehicle 58 (Figure 5) when the second tube portion 46 is in the outwardly extending position shown in this figure.

A tapered helical spring 60 is situated within the confines of container L and has a long shank 62 extending downwardly therefrom through the first tube portion 45 and into the second portion 46. The function of spring 60 and shank 62 will be explained in detail hereinafter.

Container L, as can best be seen in Figure 2, is removably supported in an inverse position on the forward portion of one of the fenders D by bands 64 or other fastening means that are removably affixed to the fender by screws 66, or the like. A helical spring 68 encircles the first tube portion 45, and one end 68a of the spring is affixed thereto. The other end 68b of spring 68 is rigidly connected to a bracket 69 or other suitable member affixed to fender D. Spring 68 is so tensioned that it at all times tends to hold second tube portion 46 and extension 48 in a longitudinally extending position relative to motorcycle K, substantially parallel to one of the rear wheels C. An arm 70 projects outwardly from tube portion 45, and an eye 72 is formed in the outer end of arm 70 through which an end section of a cable 74 is linked. The opposite end of cable 74 terminates in a threaded rod 76 of such transverse cross section as to be slidably inserted within one of the slots 20. The free end portion of rod 76 is engageable by a nut 78, as may be seen in Figure 8. When the marking device is being used, only one cable 74 is so disposed that the rod 76 associated therewith is situated within the confines of one of the slots 20. The one of the two devices to be used (mounted on motorcycle K) is that on the side of the motorcycle adjacent the parked vehicles 58, the tires 56 of which are to be marked.

The use of the invention is extremely simple. After the device has been mounted on motorcycle K as above described, that one on the side adjacent vehicles 58 is placed in an operative position by disposing the threaded member 76 in that slot 20 it is adapted to removably engage. The other threaded rod 76 is removed from slot 20 which it normally would engage.

The motorcycle K may then be driven alongside the parked vehicles 58 in order to check and mark tires 56. As the rear tire of each vehicle is approached, the trigger 30 is actuated to cause cable 26 to pivot arm 16 in a clockwise direction (see Figure 2), with this arm movement in turn causing clockwise rotation of one of the bifurcated members 20. As members 20 are so rotated, one of them draws cable 74 forwardly causing rotation of arm and outward swinging away from motorcycle K of the second tube portion 46 thereof as well as the perforated marking portion 48 situated on the extremity thereof. When an officer driving a motorcycle equipped with the present invention approaches a vehicle to be marked he pivots trigger 30 to dispose extension 48 in the position shown in Figure 5. Extension 48 so remains until it comes into contact with the tread portion of the vehicle tire. The impact between extension 48 and the tire tread causes particled material to be forcefully discharged through perforations 52 into the tread to which the particles adhere in a clearly visible pattern. Inasmuch as the particled material is forcefully projected onto the tread, it makes no difference whether the tread is dry, damp or wet, for no wiping action is involved in placing a clearly visible mark thereon. After the operator feels the impact between extension 48 and the tire, he releases the pressure on trigger 30 and the movable portion of the invention immediately assumes the longitudinally extending position shown in Figure 1 due to the action of spring 68. However, should the operator fail to release the pressure on trigger 30, no harm is done for due to the closed end 50 of extension 48, no marks would be made on the white side wall of a tire being marked as the extension slides across same.

Spring 68 at all times tends to maintain tube 44, portion 46 and extremity 48 in a longitudinally extending position adjacent one of the tires C. Tube portion 46 and extension 48 are only disposed in the outwardly extending position shown in Figure 5 when the trigger mechanism 30 is actuated. The tapered helical spring 60 positioned within container L is, of course, pivoted each time tube 44 is pivoted, with this motion of the spring tending at all times to agitate the particled material and cause discharge thereof from container L downwardly through tube 44 to the perforated extremity 48.

Upon occasion it may be desirable to use chalk for marking purposes, in which event the necessity of filling container L with particled material is eliminated. In fact, container L need not even be mounted on the motorcycle if chalk is used. When chalk is employed for marking, the tube portion 45 as well as second tube portion 46 are used but the rearward extension 48 is replaced by an extension 48' of the design shown in Figure 7. Extension 48' is so oriented as to be parallel to the pavement when the invention is disposed on the motorcycle, as shown in Figure 2. Extension 48' has a longitudinally extending slot 80 formed therein, through which a longitudinally extending section of chalk or crayon projects. Chalk or crayon 82 is held in this position within extension 48' by a thumb screw 84 which is threaded in a tapped bore 86 formed in the extension. Screw 84 bears against chalk or crayon 82 to prevent inadvertent displacement of the chalk or crayon from the slotted extension. The chalk or crayon 82 is brought into marking contact with tread 54 of tire 56 in the same manner as the perforated extension 48. It will be apparent that tube 44 with either extension 48 or extension 48' need not be an integral unit, but that the extensions can be removably affixed to the rear end of tube portion 46.

Although the forms of the invention shown and described herein are fully capable of achieving the objects and providing the advantages as outlined, it is to be understood that they are merely illustrative of the presently preferred embodiments of the invention and there is no intention to limit same to the design and construction herein described other than as defined in the appended claims.

I claim:

1. A tire marking device for the use of motorcycle traffic officers in marking tires of parked vehicles with particled material, comprising: a container for said particled marking material, said container having a discharge opening; means to removably support said container in an inverted position on said motorcycle; a tube that includes a first portion that is substantially vertically disposed, and a second portion that is angularly disposed relative to said first portion; means that pivotally support said first tube portion on said motorcycle; means that pivotally connect the upper extremity of said first tube portion to said discharge opening; spring means that normally maintain said tube in a position wherein said second tube portion is longitudinally disposed relative to said motorcycle; marking material application means mounted on the free extremity of said second tube portion; manually operable means for pivoting said tube to swing said marking material application means into contact with a tire of a parked vehicle while said motorcycle is in motion; and means to agitate said marking material in said container each time said tube is pivoted to cause said material to flow from said container through said tube to said application means.

2. A marking device according to claim 1 further characterized by the fact that said container has a neck in which said discharge opening is formed, a stopper for said neck that is removably affixed thereto, which stopper defines a ring-shaped flange, said means which pivotally connect said first tube portion to said discharge opening is a circular member affixed to the upper extremity of said first tube portion, said circular member being formed with a longitudinally extending bore that communicates with the interior of said first tube portion, which member is formed with a circumferentially extending groove that rotatably and sealingly engages said flange.

3. A marking device according to claim 1 further characterized by the fact that said spring means is a tensioned helical spring that encircles said first tube portion, with one end of said spring being affixed to said first tube portion and the other end thereof being affixed to a portion of said motorcycle.

4. A marking device according to claim 1 further characterized by the fact that said manually operable means comprises a shaft transversely positioned on said motorcycle, bearings mounted on said motorcycle that rotatably support said shaft, means operable while said motorcycle is in motion to pivot said shaft, an arm extending outwardly from said first tube portion, a bifurcated member rigidly affixed to said shaft, and a connecting member extending from said arm to said bifurcated member and adapted to removably engage same.

5. A marking device according to claim 1 further characterized by the fact that said means to agitate said marking material is a helical spring disposed within said container, said spring having a shank that extends through said first tube portion into said second tube portion, which spring is pivoted relative to said particled material with each pivotal movement of said first and second tube portions.

6. A marking device according to claim 1 further characterized by the fact that said marking material application means is an extension of said second tube portion, with the outer end of said extension being closed, and said extension has a plurality of longitudinally spaced perforations formed therein through which said particled material is discharged when said extension is brought into contact with the tread of the tire of a parked vehicle.

7. A marking device according to claim 2 further characterized by the fact that said spring means is a tensioned helical spring that encircles said first tube portion, with one end of said spring being affixed to said first tube portion and the other end of said spring being affixed to a portion of said motorcycle.

8. A marking device according to claim 3 further characterized by the fact that said manually operable means comprises a shaft transversely positioned on said motorcycle, bearings mounted on said motorcycle that rotatably support said shaft, manually operable means to pivot said shaft, an arm extending outwardly from said first tube portion, a bifurcated member rigidly affixed to said shaft, and a connecting member extending from said arm to said bifurcated member and adapted to removably engage same.

9. A marking device according to claim 4 further characterized by the fact that said connecting member comprises a flexible cable affixed to said arm, a rigid threaded member mounted on the free end of said cable that is adapted to be removably disposed in said bifurcated member, and a nut that engages said threaded member that bears against said bifurcated member when said threaded member is disposed therein.

10. A marking device for the use of motorcycle traffic officers in marking tires of parked vehicles with particled material, comprising: two containers for said particled marking material, said containers having discharge openings; means to removably support said containers in inverted positions on opposite sides of said motorcycle; two tubes, each of which include a first portion that is substantially vertical and a second portion that is angularly disposed relative to said first portion; means that pivotally support said first tube portion on opposite sides of said motorcycle; means that pivotally connect the upper extremities of said first tube portions to said discharge openings; spring means that normally maintain said tubes in positions where said second portions are longitudinally disposed relative to said motorcycle on opposite sides thereof; marking material application means mounted on the free extremities of said second tube portions; manually operable means which permit the selective swinging of either of said tubes outwardly to bring said application means into contact with a tire of a parked vehicle while said motorcycle is in motion; and means to agitate said marking material in each of said containers each time said tube associated therewith is pivoted.

11. A marking device according to claim 10 further characterized by the fact that said manually operable means comprises a shaft transversely positioned on said motorcycle, bearings mounted on said motorcycle that rotatably support said shaft, means operable while said motorcycle is in motion to pivot said shaft, two arms extending outwardly from said two first tube portions, two bifurcated members, longitudinally spaced and rigidly affixed to said shaft, and two connecting members extending from said arms and manually connectible to said bifurcated members, but only one of said connecting members being used at one time depending upon which of said tubes it is desired to pivot outwardly.

12. A marking device according to claim 11 further characterized by the fact that each of said containers is provided with a neck in which one of said discharge openings is formed, a stopper for each of said necks that is removably affixed thereto, with each of said stoppers defining a ring-shaped flange and each of said means pivotally connecting said first tube portion to said discharge opening being a circular member affixed to the upper extremity of said first tube portion, which circular member is formed with a longitudinally extending bore that communicates with the interior of said first tube portion with said member having a circumferentially extending groove that rotatably and sealingly engages said flange.

13. A marking device according to claim 12 further characterized by the fact that each of said connecting members comprises a flexible cable affixed to said arm, a rigid threaded member mounted on the free end of said cable that is adapted to be removably disposed in said bifurcated member, and a nut that engages said threaded member and bears against said bifurcated member when said threaded member is disposed therein.

References Cited in the file of this patent

UNITED STATES PATENTS

| 2,283,515 | Thompson | May 19, 1942 |
| 2,687,116 | Sheets | Aug. 24, 1954 |